United States Patent
Hamon et al.

(10) Patent No.: US 10,586,964 B2
(45) Date of Patent: Mar. 10, 2020

(54) SOLID COMPOSITE FLUOROPOLYMER SEPARATOR

(71) Applicant: SOLVAY SA, Brussels (BE)

(72) Inventors: Christine Hamon, Arese (IT); Milena Stanga, Origgio (IT); Riccardo Pieri, Milan (IT)

(73) Assignee: SOLVAY SA, Brussels (BE)

( * ) Notice: Subject to any disclaimer, the term of this patent is extended or adjusted under 35 U.S.C. 154(b) by 0 days.

(21) Appl. No.: 14/911,356

(22) PCT Filed: Aug. 5, 2014

(86) PCT No.: PCT/EP2014/066771
§ 371 (c)(1),
(2) Date: Feb. 10, 2016

(87) PCT Pub. No.: WO2015/022229
PCT Pub. Date: Feb. 19, 2015

(65) Prior Publication Data
US 2016/0204405 A1 Jul. 14, 2016

(30) Foreign Application Priority Data
Aug. 12, 2013 (EP) .................................... 13180028

(51) Int. Cl.
| | | |
|---|---|---|
| *H01M 2/14* | (2006.01) | |
| *H01M 10/0525* | (2010.01) | |
| *H01M 2/16* | (2006.01) | |

(52) U.S. Cl.
CPC .......... *H01M 2/145* (2013.01); *H01M 2/162* (2013.01); *H01M 2/166* (2013.01);
(Continued)

(58) Field of Classification Search
None
See application file for complete search history.

(56) References Cited

U.S. PATENT DOCUMENTS

| | | |
|---|---|---|
| 4,990,283 A | 2/1991 | Visca et al. |
| 5,498,680 A | 3/1996 | Abusleme et al. |
| (Continued) | | |

FOREIGN PATENT DOCUMENTS

| | | | |
|---|---|---|---|
| CN | 101707242 A | | 5/2010 |
| WO | WO2011121078 | * | 10/2011 |
| (Continued) | | | |

*Primary Examiner* — Christopher P Domone (57) ABSTRACT

The present invention pertains to a process for manufacturing a solid composite separator, said process comprising the following steps: (i) providing a liquid composition [composition (L)] comprising, preferably consisting of:

at least one fluoro-polymer [polymer (F)] comprising one or more backbone chains, said backbone chains comprising recurring units derived from at least one fluorinated monomer [monomer (F)], and one or more side functional groups selected from the group consisting of —O—$R_x$ and —C(O)O—$R_x$ groups, wherein $R_x$ is a hydrogen atom or a $C_1$-$C_5$ hydrocarbon group comprising at least one hydroxyl group, optionally, at least one metal compound of formula (I) [compound (M)]: $X_{4-m}AY_m$ wherein X is a hydrocarbon group, optionally comprising one or more functional groups, m is an integer from 1 to 4, A is a metal selected from the group consisting of Si, Ti and Zr, and Y is a hydrolysable group selected from the group consisting of an alkoxy group, an acyloxy group and a hydroxyl group, at least one inorganic filler [filler (I)], and a liquid medium [medium (L)]; (ii) providing a porous substrate layer made from one or more sets of polymer fibres [substrate (P)]; (iii) applying the composition (L) onto the substrate (P) thereby providing a wet substrate (P) [substrate (P-W)]; (iv) drying and then, optionally, curing the substrate (P-W) provided in step (iii) thereby providing a solid composite separator; and (v) option- (Continued)

ally, submitting to compression the solid composite separator provided in step (iv). The present invention also pertains to the solid composite separator obtainable by said process and to use of the solid composite separator in electrochemical devices.

20 Claims, 1 Drawing Sheet

(52) U.S. Cl.
CPC ....... *H01M 2/1646* (2013.01); *H01M 2/1666* (2013.01); *H01M 2/1686* (2013.01); *H01M 10/0525* (2013.01)

(56) References Cited

U.S. PATENT DOCUMENTS

| | | |
|---|---|---|
| 6,103,843 A | 8/2000 | Abusleme et al. |
| 2007/0238017 A1 | 10/2007 | Call et al. |
| 2012/0115029 A1* | 5/2012 | Carlson ................. H01M 2/166 429/211 |
| 2013/0023620 A1* | 1/2013 | Abusleme ................. C08F 8/00 524/546 |
| 2013/0280584 A1 | 10/2013 | Matsumura |
| 2015/0017512 A1 | 1/2015 | Terwonne et al. |
| 2015/0030906 A1* | 1/2015 | Amin-Sanayei ....... H01G 11/52 429/144 |

FOREIGN PATENT DOCUMENTS

| | | |
|---|---|---|
| WO | 2012073996 A1 | 6/2012 |
| WO | 2012175418 A1 | 12/2012 |
| WO | 2013072216 A1 | 5/2013 |
| WO | 2013113673 A1 | 8/2013 |

\* cited by examiner

Fig. 1

Fig. 2

SOLID COMPOSITE FLUOROPOLYMER SEPARATOR

This application is a U.S. national stage entry under 35 U.S.C. § 371 of International Application No. PCT/EP2014/066771 filed Aug. 5, 2014, which claims priority to European application No. 13180028.6 filed on Aug. 12, 2013. The entire contents of these applications are explicitly incorporated herein by this reference.

TECHNICAL FIELD

The present invention pertains to a process for the manufacture of a solid composite fluoropolymer separator, to the solid composite fluoropolymer separator obtainable from said process and to the use of the solid composite fluoropolymer separator in electrochemical devices.

BACKGROUND ART

Separators for use in electrochemical devices, in particular in secondary batteries, mainly serve to physically and electrically separating the anode from the cathode of the electrochemical cell, while permitting electrolyte ions to flow there through.

Separators must be chemically and electrochemically stable towards the electrolyte and the electrode materials and must be mechanically strong to withstand high tensions generated during battery assembly operations.

Further, their structure and properties considerably affect battery performances, including energy density, power density, cycle life as well as safety.

For high energy and power densities, the separator is required to be very thin and highly porous while still remaining mechanically strong.

For battery safety, the separator should be able to shut the battery down when overheating occurs so that thermal runaway, causing dimensional shrinking or melting of the separator, which results in physical contact of the electrodes, and the resulting internal short circuit can be avoided.

Also, a low thickness of the separator is required for high energy and power densities. However, this adversely affects the mechanical strength of the separator and the safety of the battery thereby provided.

Inorganic composite membranes have been widely used as separators for electrochemical devices including secondary batteries, in particular Lithium-ion batteries.

A variety of inorganic filler materials have been long used to fabricate inorganic composite membranes wherein inorganic particles are distributed throughout a polymeric binder matrix.

Although inorganic composite membranes offer excellent wettability by the electrolytes, good thermal stability and zero-dimensional shrinkage at high temperatures, they are usually not mechanically strong enough to withstand handling in cell winding and assembly.

In particular, separators used in wound electrochemical cells require a high mix penetration strength to avoid penetration of electrode materials through the separator. If particulate materials from the electrodes penetrate the separator, a short circuit will result.

In many cases, the inorganic composite membrane contains a very high content of inorganic filler materials. In some instances, the inorganic composite membrane so obtained exhibits poor mechanical strength.

One particular challenge has been thus to provide for multi-layer composite membranes with acceptable thickness to be suitably used as separators in electrochemical devices.

Multilayer composite membranes can be obtained using multiple coating steps. However, multiple steps disadvantageously increase processing costs.

There is thus still the need in the art for an alternative process for manufacturing solid composite separators and for solid composite separators having high porosity and thus high ionic conductivity to be suitably used as separators in electrochemical devices while maintaining outstanding thermo-mechanical properties during assembly and/or operation of the same.

SUMMARY OF INVENTION

It has been now surprisingly found that the solid composite separator of the invention is advantageously endowed with enhanced thermo-mechanical properties to be suitably used in electrochemical cells.

In a first instance, the present invention pertains to a process for manufacturing a solid composite separator, said process comprising the following steps:

(i) providing a liquid composition [composition (L)] comprising, preferably consisting of:

at least one fluoropolymer [polymer (F)] comprising one or more backbone chains, said backbone chains comprising recurring units derived from at least one fluorinated monomer [monomer (F)], and one or more side functional groups selected from the group consisting of —O—$R_X$ and —C(O)O—$R_X$ groups, wherein $R_X$ is a hydrogen atom or a $C_1$-$C_5$ hydrocarbon group comprising at least one hydroxyl group,     optionally, at least one metal compound of formula (I) [compound (M)]:

$$X_{4-m}AY_m$$

wherein X is a hydrocarbon group, optionally comprising one or more functional groups, m is an integer from 1 to 4, A is a metal selected from the group consisting of Si, Ti and Zr, and Y is a hydrolysable group selected from the group consisting of an alkoxy group, an acyloxy group and a hydroxyl group,     at least one inorganic filler [filler (I)], and     a liquid medium [medium (L)];

(ii) providing a porous substrate layer made from one or more sets of polymer fibres [substrate (P)];

(iii) applying the composition (L) onto the substrate (P) thereby providing a wet substrate (P) [substrate (P-W)];

(iv) drying and then, optionally, curing the substrate (P-W) provided in step (iii) thereby providing a solid composite separator; and (v) optionally, submitting to compression the solid composite separator provided in step (iv).

According to a first embodiment of the process of the invention, the present invention pertains to a process for manufacturing a solid composite separator, said process comprising the following steps: (i-1) providing a liquid composition [composition (L)] comprising, preferably consisting of:

at least one fluoropolymer [polymer (F)] comprising one or more backbone chains, said backbone chains comprising recurring units derived from at least one fluorinated monomer [monomer (F)], and one or more side functional groups selected from the group consisting of —O—$R_x$ and —C(O)O—$R_X$ groups, wherein $R_X$ is a hydrogen atom or a $C_1$-$C_5$ hydrocarbon group comprising at least one hydroxyl group,
at least one inorganic filler [filler (I)], and
a liquid medium [medium (L)];
(ii-1) providing a porous substrate layer made from one or more sets of polymer fibres [substrate (P)];
(iii-1) applying the composition (L) onto the substrate (P) thereby providing a wet substrate (P) [substrate (P-W)];
(iv-1) drying and then, optionally, curing the substrate (P-W) provided in step (iii-1) thereby providing a solid composite separator; and
(v-1) optionally, submitting to compression the solid composite separator provided in step (iv-1).

According to a second embodiment of the process of the invention, the present invention pertains to a process for manufacturing a solid composite separator, said process comprising the following steps:
(i-2) providing a liquid composition [composition (L)] comprising, preferably consisting of:
at least one fluoropolymer [polymer (F)] comprising one or more backbone chains, said backbone chains comprising recurring units derived from at least one fluorinated monomer [monomer (F)], and one or more side functional groups selected from the group consisting of —O—$R_x$ and —C(O)O—$R_X$ groups, wherein $R_X$ is a hydrogen atom or a $C_1$-$C_5$ hydrocarbon group comprising at least one hydroxyl group,
at least one metal compound of formula (I) [compound (M)]:

$X_{4-m}AY_m$ wherein X is a hydrocarbon group, optionally comprising one or more functional groups, m is an integer from 1 to 4, A is a metal selected from the group consisting of Si, Ti and Zr, and Y is a hydrolysable group selected from the group consisting of an alkoxy group, an acyloxy group and a hydroxyl group,
at least one inorganic filler [filler (I)], and
a liquid medium [medium (L)];
(ii-2) providing a porous substrate layer made from one or more sets of polymer fibres [substrate (P)];
(iii-2) reacting at least a fraction of said side functional group(s) of the polymer(s) (F) with at least a fraction of said hydrolysable group(s) Y of the compound(s) (M) thereby providing a liquid composition [composition (L1)] comprising at least one grafted fluoropolymer [polymer (F-G)] comprising one or more backbone chains, said backbone chains comprising recurring units derived from at least one fluorinated monomer [monomer (F)], and one or more pendant groups of formula —$Y_{m-1}$-$AX_{4-m}$, wherein m, Y, A and X have the same meaning as defined above;
(iv-2) submitting to at least partial hydrolysis and/or polycondensation the composition (L1) provided in step (iii-2) thereby providing a liquid composition [composition (L2)] comprising at least one fluoropolymer hybrid organic/inorganic composite [polymer (F-H)] comprising, preferably consisting of, fluoropolymer domains consisting of chains obtainable by the polymer (F-G) and inorganic domains consisting of residues obtainable by the compound (M);
(v-2) applying the composition (L2) provided in step (iv-2) onto the substrate (P) thereby providing a wet substrate (P) [substrate (P-W)];
(vi-2) drying and then, optionally, curing the substrate (P-W) provided in step (v-2) thereby providing a solid composite separator; and
(vii-2) optionally, submitting to compression the solid composite separator provided in step (vi-2).

In a second instance, the present invention pertains to the solid composite separator obtainable by the process of the invention.
Thus, the present invention also pertains to a solid composite separator comprising:
(1) at least one layer [layer (1)] made from a solid composition [composition (S)] comprising:
at least one fluoropolymer [polymer (F)] comprising one or more backbone chains, said backbone chains comprising recurring units derived from at least one fluorinated monomer [monomer (F)], and one or more side functional groups selected from the group consisting of —O—$R_x$ and —C(O)O—$R_X$ groups, wherein $R_X$ is a hydrogen atom or a $C_1$-$C_5$ hydrocarbon group comprising at least one hydroxyl group,
optionally, at least one fluoropolymer hybrid organic/inorganic composite [polymer (F-H)] comprising, preferably consisting of, fluoropolymer domains consisting of chains obtainable by the polymer (F-G) and inorganic domains consisting of residues obtainable by the compound (M), and
at least one inorganic filler [filler (I)]; and, adhered to at least one surface of said layer (1),
(2) a porous substrate layer [layer (2)] made from one or more sets of polymer fibres [substrate (P)].

By the term "solid composite separator" it is hereby intended to denote a composite separator in the solid state at 20° C. under atmospheric pressure.
By the term "solid composition [composition (S)]" it is hereby intended to denote a composition in the solid state at 20° C. under atmospheric pressure.
It is understood that the solid composite separator obtainable by the process of the invention is a unitary assembly wherein at least one surface of at least one layer (1) made from the composition (S) is adhered to the substrate (P).
It has been found that the solid composite separator of the invention is advantageously endowed with low dimensional shrinkage values over a wide range of temperatures and is thus able not to curl at the edges when unrolled during assembly of the electrochemical cell.
Also, it has been found that the solid composite separator of the invention is advantageously endowed with high mix penetration strength values, independently from its thickness, and is thus able to resist penetration there through of electrode materials during assembly and winding of the electrochemical cell.
Further, it has been found that the solid composite separator of the invention is advantageously endowed with outstanding mechanical strength over a wide range of temperatures.
The solid composite separator obtainable by the first embodiment of the process of the invention typically comprises:
(1) at least one layer [layer (1)] made from a solid composition [composition (S)] comprising:
at least one fluoropolymer [polymer (F)] comprising one or more backbone chains, said backbone chains comprising recurring units derived from at least one fluorinated monomer [monomer (F)], and one or more side functional groups selected from the group consisting of —O—$R_x$ and —C(O)O—$R_X$ groups, wherein $R_X$ is a hydrogen atom or a $C_1$-$C_5$ hydrocarbon group comprising at least one hydroxyl group, and
at least one inorganic filler [filler (I)]; and, adhered to at least one surface of said layer (1),
(2) a porous substrate layer [layer (2)] made from one or more sets of polymer fibres [substrate (P)].

The solid composite separator obtainable by the second embodiment of the process of the invention typically comprises:

(1) at least one layer [layer (1)] made from a solid composition [composition (S)] comprising:
at least one fluoropolymer [polymer (F)] comprising one or more backbone chains, said backbone chains comprising recurring units derived from at least one fluorinated monomer [monomer (F)], and one or more side functional groups selected from the group consisting of —O—$R_x$ and —C(O)O—$R_X$ groups, wherein $R_X$ is a hydrogen atom or a $C_2$-$C_5$ hydrocarbon group comprising at least one hydroxyl group,
at least one fluoropolymer hybrid organic/inorganic composite [polymer (F-H)] comprising, preferably consisting of, fluoropolymer domains consisting of chains obtainable by the polymer (F-G) and inorganic domains consisting of residues obtainable by the compound (M), and
at least one inorganic filler [filler (I)]; and, adhered to at least one surface of said layer (1), (2) a porous substrate layer [layer (2)] made from one or more sets of polymer fibres [substrate (P)].

In a third instance, the present invention pertains to use of the solid composite separator of the invention in an electrochemical device.

Non-limitative examples of suitable electrochemical devices include, notably, secondary batteries, especially, alkaline or an alkaline-earth secondary batteries such as lithium ion batteries, and capacitors, especially lithium ion capacitors.

The solid composite separator of the invention generally has a porosity of advantageously at least 5%, preferably at least 10%, more preferably at least 20% and advantageously at most 90%, preferably at most 80%.

Determination of the porosity can be performed by any suitable method.

The solid composite separator of the invention generally has a thickness comprised between 10 μm and 200 μm, preferably between 10 μm and 100 μm, more preferably between 15 μm and 50 μm.

Determination of the thickness can be performed by any suitable method.

The thickness is preferably determined according to ISO 4593 standard procedure.

In a fourth instance, the present invention pertains to use of the solid composite separator of the invention in a secondary battery.

Thus, the present invention further pertains to a secondary battery comprising:
the solid composite separator according to the invention,
a negative electrode,
a positive electrode, and
an electrolyte comprising a charge carrying medium and at least one metal salt.

The solid composite separator of the invention is typically located between the positive electrode and the negative electrode of the secondary battery.

The polymer (F) is typically obtainable by polymerization of at least one fluorinated monomer [monomer (F)], at least one hydrogenated monomer comprising one or more functional groups selected from the group consisting of —O—$R_x$ and —C(O)O—$R_X$ groups, wherein $R_X$ is a hydrogen atom or a $C_1$-$C_5$ hydrocarbon group comprising at least one hydroxyl group [monomer ($H_f$)] and, optionally, at least one hydrogenated monomer different from the monomer ($H_f$) [monomer (H)].

By the term "fluorinated monomer [monomer (F)]" it is hereby intended to denote an ethylenically unsaturated monomer comprising at least one fluorine atom.

By the term "hydrogenated monomer" it is hereby intended to denote an ethylenically unsaturated monomer comprising at least one hydrogen atom and free from fluorine atoms.

The term "at least one fluorinated monomer" is understood to mean that the polymer (F) may comprise recurring units derived from one or more than one fluorinated monomers. In the rest of the text, the expression "fluorinated monomers" is understood, for the purposes of the present invention, both in the plural and the singular, that is to say that they denote both one or more than one fluorinated monomers as defined above.

The term "at least one hydrogenated monomer" is understood to mean that the polymer (F) may comprise recurring units derived from one or more than one hydrogenated monomers. In the rest of the text, the expression "hydrogenated monomers" is understood, for the purposes of the present invention, both in the plural and the singular, that is to say that they denote both one or more than one hydrogenated monomers as defined above.

The polymer (F) comprises preferably at least 0.01% by moles, more preferably at least 0.05% by moles, even more preferably at least 0.1% by moles of recurring units derived from at least one monomer ($H_f$) as defined above.

The polymer (F) comprises preferably at most 20% by moles, more preferably at most 15% by moles, even more preferably at most 10% by moles, most preferably at most 3% by moles of recurring units derived from at least one monomer ($H_f$) as defined above.

Determination of average mole percentage of monomer ($H_f$) recurring units in polymer (F) can be performed by any suitable method. Mention can be notably made of acid-base titration methods, well suited e.g. for the determination of the acrylic acid content, of NMR methods, adequate for the quantification of monomers ($H_f$) comprising aliphatic hydrogens in side chains, of weight balance based on total fed monomer ($H_f$) and unreacted residual monomer ($H_f$) during polymer (F) manufacture.

The monomer ($H_f$) is typically selected from the group consisting of (meth)acrylic monomers of formula (II) or vinylether monomers of formula (III):

(II)

(III)

wherein each of $R_1$, $R_2$ and $R_3$, equal to or different from each other, is independently a hydrogen atom or a $C_1$-$C_3$ hydrocarbon group, and $R_X$ is a hydrogen atom or a $C_1$-$C_5$ hydrocarbon moiety comprising at least one hydroxyl group.

The monomer ($H_f$) preferably complies with formula (II) as defined above.

The monomer ($H_f$) more preferably complies with formula (II-A):

(II-A)

wherein $R'_1$, $R'_2$ and $R'_3$ are hydrogen atoms and $R'_X$ is a hydrogen atom or a $C_1$-$C_5$ hydrocarbon moiety comprising at least one hydroxyl group.

Non limitative examples of monomers ($H_f$) include, notably, acrylic acid, methacrylic acid, hydroxyethyl(meth)acrylate, hydroxypropyl(meth)acrylate, hydroxyethylhexyl (meth)acrylate.

The monomer ($H_f$) is even more preferably selected from the followings:

hydroxyethyl acrylate (HEA) of formula:

2-hydroxypropyl acrylate (HPA) of either of formulae:

acrylic acid (AA) of formula:

and mixtures thereof.

The polymer (F) may be amorphous or semi-crystalline.

The term "amorphous" is hereby intended to denote a polymer (F) having a heat of fusion of less than 5 J/g, preferably of less than 3 J/g, more preferably of less than 2 J/g, as measured according to ASTM D-3418-08.

The term "semi-crystalline" is hereby intended to denote a polymer (F) having a heat of fusion of from 10 to 90 J/g, preferably of from 30 to 60 J/g, more preferably of from 35 to 55 J/g, as measured according to ASTM D3418-08.

The polymer (F) is preferably semi-crystalline.

Non limitative examples of suitable monomers (F) include, notably, the followings:

$C_3$-$C_8$ perfluoroolefins, such as tetrafluoroethylene and hexafluoropropene;

$C_2$-$C_8$ hydrogenated fluoroolefins, such as vinylidene fluoride, vinyl fluoride, 1,2-difluoroethylene and trifluoroethylene;

perfluoroalkylethylenes complying with formula $CH_2=CH-R_{f0}$ wherein $R_{f0}$ is a $C_1$-$C_6$ perfluoroalkyl;

chloro- and/or bromo- and/or iodo-$C_2$-$C_6$ fluoroolefins, such as chlorotrifluoroethylene;

(per)fluoroalkylvinylethers complying with formula $CF_2=CFOR_{f1}$ wherein $R_{f1}$ is a $C_1$-$C_6$ fluoro- or perfluoroalkyl, e.g. $CF_3$, $C_2F_5$, $C_3F_7$;

$CF_2=CFOX_0$ (per)fluoro-oxyalkylvinylethers wherein $X_0$ is a $C_1$-$C_{12}$ alkyl group, a $C_1$-$C_{12}$ oxyalkyl group or a $C_1$-$C_{12}$ (per)fluorooxyalkyl group having one or more ether groups, such as perfluoro-2-propoxy-propyl group;

(per)fluoroalkylvinylethers complying with formula $CF_2=CFOCF_2OR_{f2}$ wherein $R_{f2}$ is a $C_1$-$C_6$ fluoro- or perfluoroalkyl group, e.g. $CF_3$, $C_2F_5$, $C_3F_7$ or a $C_1$-$C_6$ (per)fluorooxyalkyl group having one or more ether groups, such as $-C_2F_5-O-CF_3$;

functional (per)fluoro-oxyalkylvinylethers complying with formula $CF_2=CFOY_0$ wherein $Y_0$ is a $C_1$-$C_{12}$ alkyl group or (per)fluoroalkyl group, a $C_1$-$C_{12}$ oxyalkyl group or a $C_1$-$C_{12}$ (per)fluorooxyalkyl group having one or more ether groups and $Y_0$ comprising a carboxylic or sulfonic acid group, in its acid, acid halide or salt form;

fluorodioxoles, especially perfluorodioxoles.

The monomer (H) is typically selected from the group consisting of non-functional monomers (H). The non-functional monomer (H) is usually free from one or more functional groups.

Non limitative examples of suitable monomers (H) include, notably, ethylene, propylene and isobutylene, and styrene monomers such as styrene and p-methylstyrene.

The polymer (F) comprises preferably more than 25% by moles, preferably more than 30% by moles, more preferably more than 40% by moles of recurring units derived from at least one monomer (F).

The polymer (F) comprises preferably more than 1% by moles, preferably more than 5% by moles, more preferably more than 10% by moles of recurring units derived from at least one monomer (H) different from the monomer ($H_f$).

The monomer (F) can further comprise one or more other halogen atoms (Cl, Br, I). Should the fluorinated monomer be free of hydrogen atoms, it is designated as per(halo)fluoromonomer. Should the monomer (F) comprise at least one hydrogen atom, it is designated as hydrogen-containing fluorinated monomer.

Should the monomer (F) be a hydrogen-containing fluorinated monomer, such as for instance vinylidene fluoride, trifluoroethylene, vinylfluoride, the polymer (F) can be either a polymer comprising, in addition to recurring units derived from at least one monomer ($H_f$) as defined above, recurring units derived only from said hydrogen-containing fluorinated monomer, or it can be a polymer comprising recurring units derived from at least one monomer ($H_f$) as defined above, from said hydrogen-containing fluorinated monomer and from at least one other monomer.

Should the monomer (F) be a per(halo)fluoromonomer, such as for instance tetrafluoroethylene, chlorotrifluoroethylene, hexafluoropropylene, perfluoroalkylvinylethers, the polymer (F) is a polymer comprising recurring units derived from at least one monomer ($H_f$) as defined above, from said per(halo)fluoromonomer and from at least one other monomer (H) different from the monomer ($H_f$).

Preferred polymers (F) are those comprising one or more backbone chains, said backbone chains comprising recurring units derived from at least one monomer (F) selected from the group consisting of vinylidene fluoride (VDF), tetrafluoroethylene (TFE) and chlorotrifluoroethylene (CTFE).

The polymer (F) is more preferably selected from the group consisting of:

polymers (F-1) comprising recurring units derived from vinylidene fluoride (VDF), from at least one monomer ($H_f$) as defined above, and, optionally, from one or more monomers (F) different from VDF, and polymers (F-2) comprising recurring units derived from at least one monomer ($H_f$) as defined above, from at least one per(halo)fluoromonomer selected from tetrafluoroethylene (TFE) and chlorotrifluoroethylene (CTFE), and from at least one monomer (H) selected from ethylene, propylene and isobutylene, optionally containing one or more additional comonomers, typically in amounts of from 0.01% to 30% by moles, based on the total amount of TFE and/or CTFE and said monomer(s) (H).

The polymer (F-1) preferably comprises:

(a') at least 60% by moles, preferably at least 75% by moles, more preferably at least 85% by moles of vinylidene fluoride (VDF);

(b') optionally, from 0.1% to 15% by moles, preferably from 0.1% to 12% by moles, more preferably from 0.1% to 10% by moles of at least one monomer (F) selected from vinylfluoride (VF$_1$), chlorotrifluoroethylene (CTFE), hexafluoropropene (HFP), tetrafluoroethylene (TFE), trifluoroethylene (TrFE), perfluoromethylvinylether (PMVE); and (c') from 0.01% to 20% by moles, preferably from 0.05% to 18% by moles, more preferably from 0.1% to 10% by moles of at least one monomer ($H_f$) of formula (II) as defined above.

In polymers (F-2) as defined above, the molar ratio per(halo)fluoromonomer(s)/monomer(s) (H) is typically of from 30:70 to 70:30. In polymers (F-2) as defined above, the monomer (H) is preferably ethylene, optionally in combination with other monomers (H).

Polymers (F-2) wherein the per(halo)fluoromonomer is predominantly chlorotrifluoroethylene (CTFE) will be identified herein below as ECTFE copolymers; polymers (F-2) wherein the per(halo)fluoromonomer is predominantly tetrafluoroethylene (TFE) will be identified herein below as ETFE copolymers.

The polymer (F-2) preferably comprises:

(a) from 35% to 65% by moles, preferably from 45% to 55% by moles, more preferably from 48% to 52% by moles of ethylene (E);

(b) from 65% to 35% by moles, preferably from 55% to 45% by moles, more preferably from 52% to 48% by moles of at least one per(halo)fluoromonomer selected from the group consisting of chlorotrifluoroethylene (CTFE) and tetrafluoroethylene (TFE);

(c) from 0.01% to 20% by moles, preferably from 0.05% to 18% by moles, more preferably from 0.1% to 10% by moles of at least one monomer ($H_f$) of formula (II) as defined above.

Among polymers (F-2), ECTFE polymers are preferred.

The polymer (F) is even more preferably selected from polymers (F-1) as defined above.

The polymer (F) is typically obtainable by emulsion polymerization or suspension polymerization.

The metal compound of formula $X_{4-m}AY_m$ (I) can comprise one or more functional groups on any of groups X and Y, preferably on at least one group X.

In case the metal compound of formula (I) as defined above comprises at least one functional group, it will be designated as functional metal compound; in case none of groups X and Y comprises a functional group, the metal compound of formula (I) as defined above will be designated as non-functional metal compound.

Mixtures of one or more functional metal compounds and one or more non-functional metal compounds can be used in the process of the invention. Otherwise, functional metal compound(s) or non-functional metal compound(s) can be separately used.

Functional metal compounds can advantageously provide for polymers (F-H) having functional groups so as to further modify the chemistry and the properties of the polymer (F-H) over native polymer (F) and native inorganic phase.

The compound (M) preferably complies with formula (I-A):

$$R'_{4-m'}E(OR'')_{m'} \qquad (I-A)$$

wherein m' is an integer from 1 to 4, and, according to certain embodiments, from 1 to 3, E is a metal selected from the group consisting of Si, Ti and Zr, R' and R'', equal to or different from each other and at each occurrence, are independently selected from $C_1$-$C_{18}$ hydrocarbon groups, optionally comprising one or more functional groups.

As non limitative examples of functional groups, mention can be made of epoxy group, carboxylic acid group (in its acid, ester, amide, anhydride, salt or halide form), sulphonic group (in its acid, ester, salt or halide form), hydroxyl group, phosphoric acid group (in its acid, ester, salt, or halide form), thiol group, amine group, quaternary ammonium group, ethylenically unsaturated group (like vinyl group), cyano group, urea group, organo-silane group, aromatic group.

With the aim of manufacturing polymers (F-H) which can exhibit functional behaviour in terms of hydrophilicity or ionic conductivity, functional groups of the metal compound of formula (I) will be preferably selected among carboxylic acid group (in its acid, ester, amide, anhydride, salt or halide form), sulphonic group (in its acid, ester, salt or halide form), hydroxyl group, phosphoric acid group (in its acid, ester, salt, or halide form), amine group, and quaternary ammonium group; most preferred will be carboxylic acid group (in its acid, ester, amide, anhydride, salt or halide form) and sulphonic group (in its acid, ester, salt or halide form).

Should the compound (M) be a functional metal compound, it more preferably complies with formula (I-B):

$$R^A_{4-m^*}E^*(OR^B)_{m^*} \qquad (I-B)$$

wherein m* is an integer from 2 to 3, E* is a metal selected from the group consisting of Si, Ti and Zr, $R^A$, equal to or different from each other and at each occurrence, is a $C_1$-$C_{12}$ hydrocarbon group comprising one or more functional groups; $R^B$, equal to or different from each other and at each occurrence, is a $C_1$-$C_5$ linear or branched alkyl radical, preferably $R^B$ is methyl or ethyl.

Examples of functional metal compounds are notably vinyltriethoxysilane, vinyltrimethoxysilane, vinyltrismethoxyethoxysilane of formula $CH_2$=$CHSi(OC_2H_4OCH_3)_3$, 2-(3,4-epoxycyclohexylethyltrimethoxysilane) of formula:

glycidoxypropylmethyldiethoxysilane of formula:

glycidoxypropyltrimethoxysilane of formula:

methacryloxypropyltrimethoxysilane of formula:

aminoethylaminpropylmethyldimethoxysilane of formula:

aminoethylaminpropyltrimethoxysilane of formula:

3-aminopropyltriethoxysilane, 3-phenylaminopropyltrimethoxysilane, 3-chloroisobutyltriethoxysilane, 3-chloropropyltrimethoxysilane, 3-mercaptopropyltriethoxysilane, 3-mercaptopropyltrimethoxysilane, n-(3-acryloxy-2-hydroxypropyl)-3-aminopropyltriethoxysilane, (3-acryloxypropyl)dimethylmethoxysilane,

(3-acryloxypropyl)methyldichlorosilane, (3-acryloxypropyl)methyldimethoxysilane,

3-(n-allylamino)propyltrimethoxysilane, 2-(4-chlorosulfonylphenyl)ethyltrimethoxysilane, 2-(4-chlorosulphonylphenyl)ethyl trichlorosilane, carboxyethylsilanetriol, and its sodium salts, triethoxysilylpropylmaleamic acid of formula:

3-(trihydroxysilyl)-1-propane-sulphonic acid of formula $HOSO_2$—$CH_2CH_2CH_2$—$Si(OH)_3$, N-(trimethoxysilylpropyl)ethylene-diamine triacetic acid, and its sodium salts, 3-(triethoxysilyl)propylsuccinic anhydride of formula:

acetamidopropyltrimethoxysilane of formula $H_3C$—$C(O)NH$—$CH_2CH_2CH_2$—$Si(OCH_3)_3$, alkanolamine titanates of formula $Ti(A)_x(OR)_y$, wherein A is an amine-substitued alkoxy group, e.g. $OCH_2CH_2NH_2$, R is an alkyl group, and x and y are integers such that x+y=4.

Examples of non-functional metal compounds are notably trimethoxysilane, triethoxysilane, tetramethoxysilane, tetraethoxysilane (TEOS), tetramethyltitanate, tetraethyltitanate, tetra-n-propyltitanate, tetraisopropyltitanate, tetra-n-butyltitanate, tetra-isobutyl titanate, tetra-tert-butyl titanate, tetra-n-pentyltitanate, tetra-n-hexyltitanate, tetraisooctyltitanate, tetra-n-lauryl titanate, tetraethylzirconate, tetra-n-propylzirconate, tetraisopropylzirconate, tetra-n-butyl zirconate, tetra-sec-butyl zirconate, tetra-tert-butyl zirconate, tetra-n-pentyl zirconate, tetra-tert-pentyl zirconate, tetra-tert-hexyl zirconate, tetra-n-heptyl zirconate, tetra-n-octyl zirconate, tetra-n-stearyl zirconate.

The substrate (P) is a porous substrate layer made from one or more sets of polymer fibres [substrate (P)].

For the purpose of the present invention, the term "fibre" is understood to mean a single, continuous filament having a finite length.

The polymer fibre typically has an average diameter comprised between 1 μm and 25 μm, preferably between 1 μm and 5 μm.

The polymer fibre is preferably made of electrically non-conductive polymers selected from the group consisting of polyesters such as polyethylene terephthalate, polyacrylonitrile, polyamides, polyimides, polyacrylates, polytetrafluoroethylene and polyolefins.

The polymer fibres may be assembled into rovings, wherein the polymer fibres as defined above are parallel to each other, or into yarns, wherein the polymer fibres as defined above are twisted together.

The substrate (P) is advantageously a fabric made from one or more sets of polymer fibres.

For the purpose of the present invention, by "fabric" is understood to mean a planar textile structure obtainable by interlacing one or more sets of polymer fibres leading to numerous pores.

The fabric may be a woven fabric made from one or more sets of polymer fibres or a non-woven fabric made from one or more sets of polymer fibres.

By "woven fabric" it is intended to denote a planar textile structure obtainable by interlacing two or more sets of polymer fibres at right angles to each other thereby providing ends which run lengthwise in the fabric and picks which run crosswise in the fabric.

By "non-woven fabric" it is intended to denote a planar textile structure obtainable by randomly interlocking or bonding mechanically, thermally or chemically one or more sets of polymer fibres leading to numerous pores.

The fabric may be a uni-directional fabric wherein the majority of the polymer fibres run in one direction.

The fabric may also be a multi-directional fabric wherein two or more sets of continuous fibres run in different directions.

The substrate (P) is preferably a non-woven fabric made from one or more sets of polymer fibres, more preferably a non-woven fabric made from polyethylene terephthalate fibres.

The substrate (P) has typically a porosity advantageously of at least 5%, preferably of at least 10%, more preferably of at least 20% and advantageously of at most 90%, preferably of at most 80%.

Determination of the porosity can be performed by any suitable method.

The substrate (P) has typically a thickness comprised between 10 µm and 200 µm, preferably between 10 µm and 100 µm, more preferably between 15 µm and 50 µm.

Determination of the thickness can be performed by any suitable method.

The thickness is preferably determined according to ISO 4593 standard procedure.

For the purpose of the present invention, the term "inorganic" is used according to its usual meaning and is intended to denote an inorganic compound which does not contain carbon atoms and is thus not considered an organic compound.

The choice of the filler (I) is not particularly limited.

The filler (I) is typically provided under the form of solid particles.

The filler (I) particles generally have an average particle size of 0.001 µm to 200 µm, preferably of 0.01 µm to 50 µm, more preferably of 0.03 pm to 10 µm.

Under step (i) of the process of the invention, the composition (L) typically comprises at least one filler (I) different from the compound (M) in an amount of from 60% to 95% by weight, more preferably of from 65% to 90% by weight, with respect to the total weight of the polymer (F) and the filler (I).

Among fillers (I) suitable for being used in the process of the invention, mention can be made of inorganic oxides, including mixed oxides, metal sulphates, metal carbonates, metal sulfides and the like.

A class of compounds which gave particularly good results within the context of this embodiment of the present invention are notably silicates, aluminium-silicates and magnesium silicates, all optionally containing additional metals such as sodium, potassium, iron or lithium.

These silicates, aluminium-silicates and magnesium silicates, all optionally containing additional metals such as sodium, potassium, iron or lithium, can be notably smectic clays, possibly of natural origin, such as notably montmorillonites, sauconite, vermiculite, hectorite, saponite, nontronite. As an alternative, silicates, aluminium-silicates and magnesium silicates, all optionally containing additional metals such as sodium, potassium, iron or lithium, can be selected among synthetic clays, like notably fluorohectorite, hectorite, laponite.

The filler (I) may be also selected from ion-conducting inorganic filler materials.

By the term "ion-conducting", it is hereby intended to denote a material permitting electrolyte ions to flow there through.

Non-limitative examples of suitable ion-conducting inorganic filler materials include, notably, lithium ceramics such as $LiTaO_3$—$SrTiO_3$, $LiTi_2(PO_4)_3$—$Li_2O$ and $Li_4SiO_4$—$Li_3PO_4$.

Also, fillers (I) having on their surface reactive groups towards the compound (M) can be used in the process of the invention.

Among surface reactive groups, mention is notably made of hydroxyl groups.

Without being bound by this theory, the Applicant believes that reaction between at least a fraction of the hydrolysable group(s) Y of the compound (M) with at least a fraction of said surface reactive groups of the filler (I) can occur simultaneously with the reaction of at least a fraction of the hydrolysable group(s) Y of the compound (M) with at least a fraction of the side functional groups of the polymer (F) so that, in subsequent hydrolysis and/or polycondensation, chemical bonding between the polymer (F) and the filler (I) is likely achieved through the inorganic domains derived from the compound (M).

The filler (I) is preferably selected among inorganic oxides.

Non-(imitative examples of suitable inorganic oxides include, notably, $SiO_2$, $TiO_2$, ZnO, $Al_2O_3$.

By the term "liquid medium", it is hereby intended to denote a medium comprising one or more substances in the liquid state at 20° C. under atmospheric pressure.

The medium (L) typically comprises, preferably consists of, water and, optionally, at least one organic solvent [solvent (S)].

The medium (L) more preferably comprises, even more preferably consists of, water and at least one solvent (S).

Non-(imitative examples of suitable solvents (S) include, notably, the followings:

aliphatic, cycloaliphatic or aromatic ether oxides, more particularly, diethyl oxide, dipropyl oxide, diisopropyl oxide, dibutyl oxide, methyltertiobutylether, dipentyl oxide, diisopentyl oxide, ethylene glycol dimethyl ether, ethylene glycol diethyl ether, ethylene glycol dibutyl ether benzyl oxide; dioxane, tetrahydrofuran (THF), glycol ethers such as ethylene glycol monomethyl ether, ethylene glycol monoethyl ether, ethylene glycol monopropyl ether, ethylene glycol monoisopropyl ether, ethylene glycol monobutyl ether, ethylene glycol monophenyl ether, ethylene glycol monobenzyl ether, diethylene glycol monomethyl ether, diethylene glycol monoethyl ether, diethylene glycol mono-n-butyl ether, glycol ether esters such as ethylene glycol methyl ether acetate, ethylene glycol monoethyl ether acetate, ethylene glycol monobutyl ether acetate, alcohols such as methyl alcohol, ethyl alcohol, diacetone alcohol, ketones such as acetone, methylethylketone, methylisobutyl ketone, diisobutylketone, cyclohexanone, isophorone, and linear or cyclic esters such as isopropyl acetate, n-butyl acetate, methyl acetoacetate, dimethyl phthalate, g-butyrolactone;

linear or cyclic amides such as N,N-diethylacetamide, N,N-dimethylacetamide, dimethylformamide and N-methyl-2-pyrrolidone; and dimethyl sulfoxide.

The solvent (S) is preferably selected from the group consisting of ketones.

Under step (i) of the process of the invention, the composition (L) is advantageously obtainable by adding at least one filler (I) and, optionally, at least one compound (M) to a composition comprising at least one polymer (F) and a medium (L).

Under step (i) of the process of the invention, the composition (L) may be obtainable by adding at least one filler (I) and, optionally, at least one compound (M) to an aqueous latex comprising at least one polymer (F).

For the purpose of the present invention, by "aqueous latex" it is hereby meant an aqueous latex obtainable by aqueous emulsion polymerization, typically in an aqueous medium, of at least one fluorinated monomer [monomer (F)], at least one hydrogenated monomer comprising one or more functional groups selected from the group consisting of —O—$R_X$ and —C(O)O—$R_X$ groups, wherein $R_X$ is a hydrogen atom or a $C_1$-$C_5$ hydrocarbon group comprising at least one hydroxyl group [monomer ($H_f$)] and, optionally, at least one hydrogenated monomer different from the monomer ($H_f$) [monomer (H)].

The aqueous emulsion polymerization is typically carried out in the presence of at least one surfactant [surfactant (S)], at least one initiator and, optionally, at least one one non-functional perfluoropolyether (PFPE) oil.

The aqueous latex obtainable by aqueous emulsion polymerization advantageously comprises at least one polymer (F) preferably under the form of primary particles having an average primary particle size comprised between 50 nm and 450 nm, preferably between 250 nm and 300 nm, as measured according to ISO 13321.

For the purpose of the present invention, by "average primary particle size" it is intended to denote primary particles of polymer (F) obtainable by aqueous emulsion polymerization. Primary particles of polymer (F) are thus to be intended distinguishable from agglomerates (i.e. collection of primary particles) which might be obtained by recovery and conditioning steps of polymer (F) manufacture such as concentration and/or coagulation of aqueous polymer (F) latexes and subsequent drying and homogenization to yield polymer (F) powders.

The aqueous latex obtainable by aqueous emulsion polymerization is thus to be intended distinguishable from an aqueous slurry prepared by dispersing polymer (F) powders in an aqueous medium. The average particle size of polymer (F) powders dispersed in an aqueous slurry is typically higher than 1 μm, as measured according to ISO 13321.

The aqueous latex obtainable by aqueous emulsion polymerization advantageously has homogeneously dispersed therein primary particles of at least one polymer (F) having an average primary particle size comprised between 50 nm and 450 nm, preferably between 250 nm and 300 nm, as measured according to ISO 13321.

The aqueous emulsion polymerization is typically carried out at a pressure comprised between 20 bar and 70 bar, preferably between 25 bar and 65 bar.

The skilled in the art will choose the polymerization temperature having regards, inter alia, of the initiator used. The aqueous emulsion polymerization temperature is typically carried out at a temperature comprised between 60° C. and 135° C., preferably between 90° C. and 130° C.

The surfactant (S) is typically selected from the group consisting of:
hydrogenated surfactants [surfactants (H)],
fluorinated surfactants [surfactants (F)], and
mixtures thereof.

The surfactant (H) is preferably selected from the group consisting of non-ionic surfactants [surfactant (NS)].

The surfactant (NS) is typically selected from the group consisting of fatty alcohol polyethers comprising recurring units derived from ethylene oxide and/or propylene oxide.

The surfactant (NS) has generally a cloud point of advantageously 50° C. or more, preferably of 55° C. or more, as measured according to EN 1890 standard (method A: 1% by weight water solution).

A surfactant (NS) which gave very good results in the process of the invention is the MARLOSOL® TA 3090 non-ionic surfactant, commercially available from Sasol Olefins and Surfactants GmbH, having a cloud point of 59° C. and a HLB of 13.3.

For the avoidance of doubt, by the term "HLB" it is meant the hydrophilic-lipophilic balance (HLB) which can be determined using the Water-Solubility Method, "The HLB System," ICI Americas, Inc., 1992.

The surfactant (F) preferably complies with formula (IV) here below:

$$R_{fS}(X^-)_k(M^+)_k \qquad (IV)$$

wherein:
$R_{fS}$ is selected from a $C_4$-$C_{16}$ (per)fluoroalkyl chain, optionally comprising one or more catenary or non-catenary oxygen atoms, and a (per)fluoropolyoxyalkyl chain,
$X^-$ is selected from —COO$^-$, —PO$_3^-$ and —SO$_3^-$,
$M^+$ is selected from $NH_4^+$ and an alkaline metal ion, and
k is 1 or 2.

Non-limitative examples of surfactants (F) suitable for the aqueous emulsion polymerization process include, notably, the followings:

(a') $CF_3(CF_2)_{n0}COOM'$, wherein no is an integer ranging from 4 to 10, preferably from 5 to 7, preferably $n_0$ being equal to 6, and M' represents $NH_4$, Na, Li or K, preferably $NH_4$;

(b') T-$(C_3F_6O)_{n1}(CFYO)_{m1}CF_2COOM''$, wherein T represents a Cl atom or a perfluoroalkoxyde group of formula $C_xF_{2x+1-x'}Cl_{x'}O$, wherein x is an integer ranging from 1 to 3 and x' is 0 or 1, $n_1$ is an integer ranging from 1 to 6, $m_1$ is 0 or an integer ranging from 1 to 6, M'' represents $NH_4$, Na, Li or K and Y represents F or —$CF_3$;

(c') F—$(CF_2CF_2)_{n2}$—$CH_2$—$CH_2$—$X^*O_3M'''$, wherein $X^*$ is a phosphorus or a sulphur atom, preferably $X^*$ being a sulphur atom, M'' represents $NH_4$, Na, Li or K and $n_2$ is an integer ranging from 2 to 5, preferably $n_2$ being equal to 3;

(d') A-$R_{bf}$—B bifunctional fluorinated surfactants, wherein A and B, equal to or different from each other, have formula —(O)$_p$CFY''—COOM*, wherein M* represents $NH_4$, Na, Li or K, preferably M* representing $NH_4$, Y'' is F or —$CF_3$ and p is 0 or 1, and $R_{bf}$ is a divalent (per)fluoroalkyl chain or (per)fluoropolyether chain such that the number average molecular weight of A-$R_{bf}$—B is in the range of from 300 to 1800; and (e') mixtures thereof.

Preferred surfactants (F) comply with formula (a') as described above.

While the choice of the initiator is not particularly limited, it is understood that water-soluble initiators suitable for aqueous emulsion polymerization are selected from compounds capable of initiating and/or accelerating the polymerization process.

Inorganic radical initiators may be used and include, but are not limited to, persulfates such as sodium, potassium and ammonium persulfates, permanganates such as potassium permanganate.

Also, organic radical initiators may be used and include, but are not limited to, the followings: acetylcyclohexanesulfonyl peroxide; diacetylperoxydicarbonate; dialkylperoxydicarbonates such as diethylperoxydicarbonate, dicyclohexylperoxydicarbonate, di-2-ethylhexylperoxydicarbonate;

tert-butylperneodecanoate; 2,2'-azobis(4-methoxy-2,4-dimethylvaleronitrile; tert-butylperpivalate; dioctanoylperoxide; dilauroyl-peroxide; 2,2'-azobis (2,4-dimethylvaleronitrile); tert-butylazo-2-cyanobutane; dibenzoylperoxide; tert-butylper-2ethylhexanoate; tert-butylpermaleate; 2,2'-azobis (isobutyronitrile); bis(tert-butylperoxy)cyclohexane; tert-butyl-peroxyisopropylcarbonate; tert-butylperacetate; 2,2'-bis(tert-butylperoxy)butane; dicumyl peroxide; di-tert-amyl peroxide; di-tert-butyl peroxide (DTBP); p-methane hydroperoxide; pinane hydroperoxide; cumene hydroperoxide; and tert-butyl hydroperoxide.

Other suitable initiators notably include halogenated free radical initiators such as chlorocarbon based and fluorocarbon based acyl peroxides such as trichloroacetyl peroxide, bis(perfluoro-2-propoxy propionyl) peroxide, $[CF_3CF_2CF_2OCF(CF_3)COO]_2$, perfluoropropionyl peroxides, $(CF_3CF_2CF_2COO)_2$, $(CF_3CF_2COO)_2$, $\{(CF_3CF_2CF_2)$-$[CF(CF_3)CF_2O]_m$—$CF(CF_3)$—$COO\}_2$ where m=0-8, $[ClCF_2(CF_2)_nCOO]_2$, and $[HCF_2(CF_2)_nCOO]_2$ where n=0-8; perfluoroalkyl azo compounds such as perfluoroazoisopropane, $[(CF_3)_2CFN=]_2$, $R^*N=NR^*$, where $R^*$ is a linear or branched perfluorocarbon group having 1-8 carbons; stable or hindered perfluoroalkane radicals such as hexafluoropropylene trimer radical, $[(CF_3)_2CF]_2(CF_2CF_2)$C. radical and perfluoroalkanes.

Redox systems, comprising at least two components forming a redox couple, such as dimethylaniline-benzoyl peroxide, diethylaniline-benzoyl peroxide and diphenylamine-benzoyl peroxide may also be used as initiators to initiate the polymerization process.

Among inorganic radical initiators, ammonium persulfate is particularly preferred.

Among organic radical initiators, the peroxides having a self-accelerating decomposition temperature (SADT) higher than 50° C. are particularly preferred, such as for instance: di-tert-butyl peroxide (DTBP), diterbutylperoxyisopropylcarbonate, terbutyl(2-ethyl-hexyl)peroxycarbonate, terbutylperoxy-3,5,5-trimethylhexanoate.

One or more initiators as defined above may be added to the aqueous medium of the aqueous emulsion polymerization process in an amount ranging advantageously from 0.001% to 20% by weight based on the weight of the aqueous medium.

By "non-functional perfluoropolyether (PFPE) oil" it is hereby intended to denote a perfluoropolyether (PFPE) oil comprising a (per)fluoropolyoxyalkylene chain [chain ($R_f$)] and non-functional end-groups.

The non-functional end groups of the PFPE oil are generally selected from fluoro(halo)alkyl groups having 1 to 3 carbon atoms, optionally comprising one or more halogen atoms different from fluorine or hydrogen atoms, e.g. $CF_3$—, $C_2F_5$—, $C_3F_6$—, $ClCF_2CF(CF_3)$—, $CF_3CFClCF_2$—, $ClCF_2CF_2$—, $ClCF_2$—.

The non-functional PFPE oil has a number average molecular weight advantageously comprised between 400 and 3000, preferably between 600 and 1500.

The non-functional PFPE oil is more preferably selected from the group consisting of:

(1') non-functional PFPE oils commercially available from Solvay Solexis S.p.A. under the trademark names GALDEN® and FOMBLIN®, said PFPE oils generally comprising at least one PFPE oil complying with either of formulae here below:

$$CF_3—[(OCF_2CF_2)_m—(OCF_2)_n]—OCF_3$$

m+n=40-180; m/n=0.5-2

$$CF_3—[(OCF(CF_3)CF_2)_p—(OCF_2)_q]—OCF_3$$

p+q=8-45; p/q=20-1000

(2') non-functional PFPE oils commercially available from Daikin under the trademark name DEMNUM®, said PFPEs generally comprising at least one PFPE complying with formula here below:

$$F—(CF_2CF_2CF_2O)_n—(CF_2CF_2CH_2O)_j—CF_2CF_3$$

j=0 or integer>0; n+j=10-150

(3') non-functional PFPE oils commercially available from Du Pont de Nemours under the trademark name KRYTOX®, said PFPEs generally comprising at least one low-molecular weight, fluorine end-capped, homopolymer of hexafluoropropylene epoxide complying with formula here below:

$$F—(CF(CF_3)CF_2O)_n—CF_2CF_3$$

n=10-60

The non-functional PFPE oil is even more preferably selected from those having formula (1') as described above.

The aqueous emulsion polymerization as detailed above is typically carried out in the presence of a chain transfer agent.

The chain transfer agent is generally selected from those known in the polymerization of fluorinated monomers such as ketones, esters, ethers or aliphatic alcohols having from 3 to 10 carbon atoms like, e.g., acetone, ethylacetate, diethylether, methyl-ter-butyl ether, isopropyl alcohol; chloro (fluoro)carbons, optionally containing hydrogen, having from 1 to 6 carbon atoms, like, e.g., chloroform, trichlorofluoromethane; bis(alkyl)carbonates wherein the alkyl has from 1 to 5 carbon atoms like, e.g., bis(ethyl)carbonate, bis(isobutyl)carbonate. The chain transfer agent may be fed to the aqueous medium at the beginning, continuously or in discrete amounts (step-wise) during the polymerization, continuous or stepwise feeding being preferred.

Aqueous emulsion polymerization processes as detailed above have been described in the art (see e.g. U.S. Pat. No. 4,990,283 (AUSIMONT S.P.A.) 05.02.1991, U.S. Pat. No. 5,498,680 (AUSIMONT S.P.A.) 12.03.1996 and U.S. Pat. No. 6,103,843 (AUSIMONT S.P.A.) 15.08.2000).

The aqueous latex preferably comprises from 20% and 30% by weight of at least one polymer (F).

The aqueous latex may be up-concentrated according to any techniques known in the art.

Under step (i-2) of the second embodiment of the process of the invention, the composition (L) is typically obtainable by adding at least one compound (M) of formula (I) to a composition comprising at least one polymer (F), at least one filler (I) and a medium (L).

Under step (i-2) of the second embodiment of the process of the invention, the composition (L) typically comprises at least one compound (M) of formula (I) in an amount comprised between 0.1% and 95% by weight, preferably between 1% and 75% by weight, more preferably between 5% and 55% by weight, based on the total weight of the polymer (F) and the compound (M).

The liquid composition [composition (L1)] provided under step (iii-2) of the second embodiment of the process of the invention advantageously comprises:

at least one grafted fluoropolymer [polymer (F-G)] comprising pendant groups of formula —$Y_{m-1}$-$AX_{4-m}$, wherein X is a hydrocarbon group, optionally comprising one or more functional groups, m is an integer from 1 to 4, A is a metal selected from the group consisting of Si, Ti and Zr, and Y is a hydrolysable group selected from the group consisting of an alkoxy group, an acyloxy group and a hydroxyl group, and a medium (L).

Figure 1:
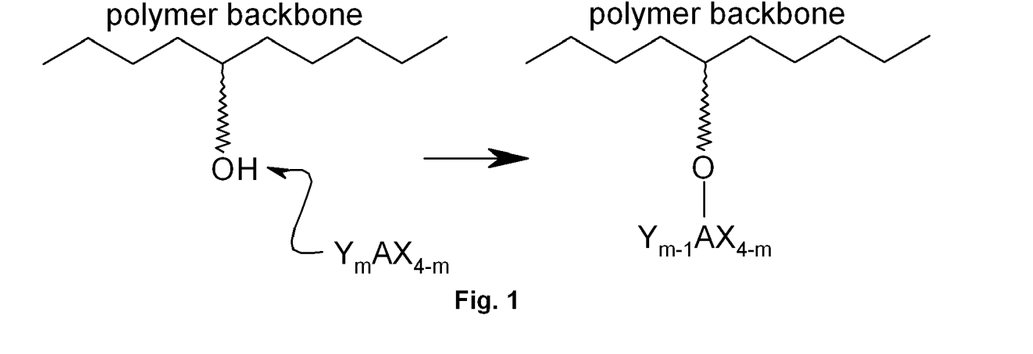

It is understood that the polymer (F-G) is obtainable as notably sketched in FIG. 1.

Under step (iii-2) of the second embodiment of the process of the invention, the polymer(s) (F) and the compound(s) (M) of formula (I) are reacted at temperatures typically comprised between 20° C. and 100° C. Temperatures between 20° C. and 90° C., preferably between 20° C. and 50° C. will be preferred.

The skilled in the art will properly select the temperature depending on the boiling point of the medium (L).

Under step (iv-2) of the second embodiment of the process of the invention, a liquid composition [composition (L2)] is advantageously obtainable by reacting by at least partial hydrolysis and/or polycondensation the hydrolysable group(s) Y of the compound(s) (M) and/or the pendant groups of formula —$Y_{m-1}AX_{4-m}$ of the polymer (F-G), wherein X, A, Y and m have the same meaning as defined above, said composition (L2) advantageously comprising:
- at least one fluoropolymer hybrid organic/inorganic composite [polymer (F-H)] comprising, preferably consisting of, fluoropolymer domains consisting of chains obtainable by the polymer (F-G) and inorganic domains consisting of residues obtainable by the compound (M), and
- a medium (L).

Figure 2:
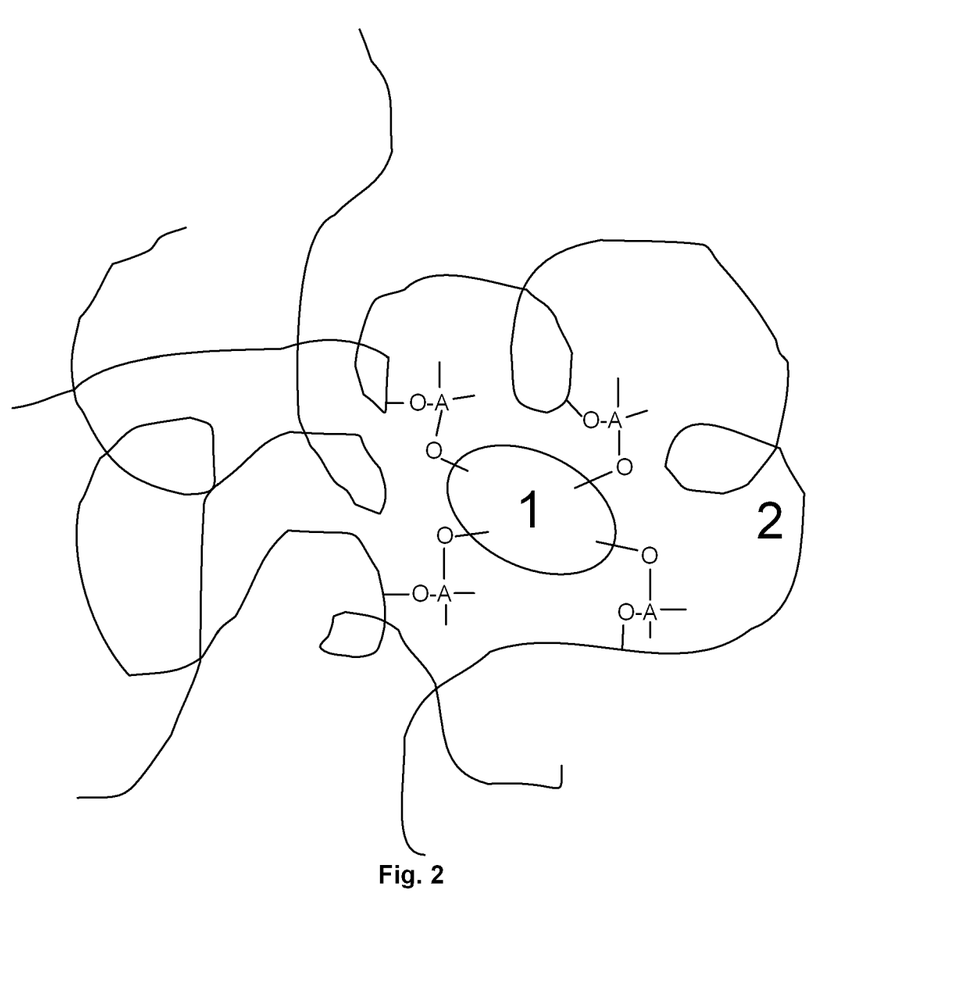

It is understood that, as notably sketched in FIG. 2, the polymer (F-H) comprises, preferably consists of, fluoropolymer domains [domains (2)] consisting of chains obtainable by the polymer (F-G) and inorganic domains [domains (1)] consisting of residues obtainable by the compound (M).

It is also understood that, while the hydrolysis and/or polycondensation reaction may be initiated during step (iii-2) of the second embodiment of the process of the invention, while reacting at least a fraction of the side functional group(s) of the polymer(s) (F) with at least a fraction of the hydrolysable group(s) Y of the compound(s) (M), said reaction may be continued during any one of steps (iv-2) to (vii-2) of this second embodiment of the process of the invention.

Under step (iv-2) of the second embodiment of the process of the invention, the hydrolysis and/or polycondensation is usually carried out at room temperature or upon heating at a temperature lower than 100° C. The temperature will be selected having regards to the boiling point of the medium (L). Temperatures between 20° C. and 90° C., preferably between 20° C. and 50° C. will be preferred.

As this will be recognized by the skilled in the art, the hydrolysis and/or polycondensation usually generates low molecular weight side products, which can be notably water or alcohol, as a function of the nature of the compound (M).

The composition (L1) and/or the composition (L2) may further comprise at least one acid catalyst.

The selection of the acid catalyst is not particularly limited. The acid catalyst is typically selected from the group consisting of organic and inorganic acids.

The acid catalyst is typically added to the composition (L1) or to the composition (L2) in an amount comprised between 0.1% and 10% by weight, preferably between 0.1% and 5% by weight.

The acid catalyst is preferably selected from the group consisting of organic acids.

Very good results have been obtained with formic acid.

Under step (iii-1) of the first embodiment of the process of the invention, the composition (L) is applied onto the substrate (P) generally using techniques commonly known in the art.

Under step (v-2) of the second embodiment of the process of the invention, the composition (L2) is applied onto the substrate (P) generally using techniques commonly known in the art.

Non-limiting examples of suitable techniques include casting, doctor blade coating, metering rod (or Meyer rod) coating, slot die coating, knife over roll coating or "gap" coating, and the like.

Under step (iii-1) of the first embodiment of the process of the invention, the composition (L) is applied onto the substrate (P) preferably by doctor blade coating techniques.

Under step (v-2) of the second embodiment of the process of the invention, the composition (L2) is applied onto the substrate (P) preferably by doctor blade coating techniques.

Under step (iv-1) or (vi-2) of the process of the invention, the substrate (P) is dried at a temperature typically comprised between 25° C. and 200° C.

Drying can be performed under modified atmosphere, e.g. under an inert gas, typically exempt notably from moisture (water vapour content of less than 0.001% v/v), or can be performed under vacuum.

The drying temperature will be selected so as to effect removal by evaporation of the medium (L) from the substrate (P) provided either in step (iii-1) or in step (v-2) of the process of the invention.

Curing, if any, is carried out at a temperature typically comprised between 100° C. and 250° C., preferably between 120° C. and 200° C.

It is understood that, under step (iv-1) or (vi-2) of the process of the invention, the medium (L) and the low molecular weight side products generated by hydrolysis and/or polycondensation, which can be notably water or alcohol, as a function of the nature of the compound (M), are at least partially removed from the substrate (P) provided either in step (iii-1) or in step (v-2) of the process of the invention, possibly further promoting, by combined action of heat and side products removal, additional hydrolysis and/or polycondensation.

Under step (v) of the process of the invention, if any, the solid composite separator provided in step (iv) is submitted to compression typically at a temperature comprised between 50° C. and 300° C.

The skilled in the art will select the temperature of step (v) of the process of the invention having regards, inter alia, of the melting point of the polymer (F) or of the polymer (F-H).

Should the disclosure of any patents, patent applications, and publications which are incorporated herein by reference conflict with the description of the present application to the extent that it may render a term unclear, the present description shall take precedence.

The invention will be now described in more detail with reference to the following examples whose purpose is merely illustrative and not limitative of the scope of the invention.

Raw Materials

Polymer (F-1)—VDF/HFP/HEA polymer

The polymer (F-1) is a VDF polymer comprising 0.7% by moles of HEA and 2.3% by moles of HFP.

Polymer (F-2)—VDF/HFP polymer

The polymer (F-2) is a VDF polymer comprising 15% by weight of HFP.

Polymer (F-3)—VDF/HFP/HEA-silica hybrid composite

The polymer (F-3) is obtainable following the procedure as detailed under Example 2-A.

Substrate (P-1)

Non-woven fabric made from polyethylene terephthalate fibres of type 012TH-10(H) having a thickness of 20 µm (commercially available from Hirose).

Compound (M-1)

Tetraethoxysilane (TEOS).

Filler (I-1)

Silica of type S5505 having an average particle size of about 0.25 µm (commercially available from Sigma Aldrich).

Determination of the thickness of the solid composite separator

The thickness of the solid composite separator was determined according to ISO 4593 standard procedure.

Determination of the dimensional shrinkage of the solid composite separator

The dimensional shrinkage of the solid composite separator was determined by comparing the longitudinal dimension (D1) and the transverse dimension (D2) of a separator sample, as measured at room temperature, with those of said separator sample placed for one hour in a ventilated oven at each selected temperature (90° C., 120° C., 150° C. and 200° C.).

Determination of the mix penetration strength of the solid composite separator

The mix penetration strength of the solid composite separator was determined at about 20° C., according to the teachings of US 2007/0238017 (CELGARD LLC) 11.10.2007, by pushing a nail having a hemispherical tip with a diameter equal to 3 mm through a separator specimen assembled between a positive electrode and a negative electrode. The tip speed was 50 mm/min.

The tip and the metallic base in contact with the positive electrode were connected to an electrical circuit. Once a short circuit occurred due to separator failure, electrical energy was furnished to a lamp which brightened.

The mix penetration strength is a measure of the force that must be applied to the tip to create a short circuit through the separator specimen having a definite thickness due to penetration of electrode materials.

Determination of the tensile properties of the solid composite separator

Tensile tests were performed by testing specimens of solid composite separators of type V according to ASTM D638 standard procedure in both the longitudinal direction (direction 1) and the transverse direction (direction 2). As no extensometer was used, specimen shape correction was applied.

The apparent elastic modulus was evaluated with a crosshead speed equal to 1 mm/min as the maximum slope in the initial zone of the stress-strain curve. A crosshead speed of 50 mm/min was used for evaluating other tensile properties.

EXAMPLE 1—Manufacture of a Solid Composite Separator

EXAMPLE 1-A—Preparation of a Liquid Composition

The polymer (F-1) (0.20 g) was dissolved in 17.64 g of acetone under magnetic stirring at 55° C. until its complete dissolution. Filler (I-1) (1.80 g) was then added thereto and the resulting solution was stirred at room temperature overnight. Water [0.36 g] was added thereto before coating and the resulting solution was gently stirred.

The filler (I-1) to polymer (F-1) weight ratio was 9:1 and the acetone to water weight ratio was 9.8:0.2. The solid content of the solution so obtained was 10% by weight.

EXAMPLE 1-B—Coating and Pressing of the Liquid Composition

The substrate (P-1) was placed onto a support plate and the solution resulting from Example 1-A was casted onto said substrate (P-1) with a doctor blade system at 5 mm/s. The wet layer thickness was set to 85 µm. The liquid medium was removed at 60° C. for 15 minutes and then at 130° C. for 40 minutes. The separator so obtained was then pressed at 5 bar for 10 minutes at 130° C.

EXAMPLE 2—Manufacture of a Solid Composite Separator

EXAMPLE 2-A—Preparation of a Liquid Composition

Polymer (F-1) (0.20 g) was dissolved in 17.43 g of acetone under magnetic stirring at 55° C. until its complete dissolution. Filler (I-1) (1.75 g) was then added thereto and the resulting solution was stirred at room temperature overnight. Compound (M-1) (0.19 g) was added thereto and the resulting solution was homogenised during 10 minutes. Formic acid (0.08 g) and water (0.36 g) were added before coating and the resulting solution containing polymer (F-1)-silica hybrid composite [polymer (F-3)] was gently stirred.

The filler (I-1) to polymer (F-1) weight ratio was 8.7:1. The polymer (F-3) to polymer (F-1) weight ratio was 0.3:1 and the acetone to water weight ratio was 9.8:0.2. The solid content of the solution so obtained was 10% by weight.

EXAMPLE 2-B—Coating and Pressing of the Liquid Composition

The substrate (P-1) was placed onto a support plate and the solution resulting from Example 2-A was casted onto said substrate (P-1) with a doctor blade system at 5 mm/s. The wet layer thickness was set to 85 µm. The liquid medium was removed at about 20° C. for 2 hours, at 50° C. for 15 minutes and then at 150° C. for 40 minutes. The separator so obtained was then pressed at 5 bar for 10 minutes at 150° C.

COMPARATIVE EXAMPLE 1

Substrate (P-1) was provided as such as solid separator.

COMPARATIVE EXAMPLE 2

The same procedure as detailed under Example 1 was followed but using polymer (F-2).

COMPARATIVE EXAMPLE 3

COMPARATIVE EXAMPLE 3-A—Preparation of a Liquid Composition

Polymer (F-1) (1.0 g) was dissolved in acetone (9 g) under magnetic stirring at 55° C. until its complete dissolution. Filler (I-1) (5.67 g) of silica was then added thereto and the resulting solution was stirred at room temperature overnight.

The filler (I-1) to polymer (F-1) weight ratio was 8.5:1.5. The solid content of the solution so obtained was 43% by weight.

COMPARATIVE EXAMPLE 3-B-Coating of the Liquid Composition

The solution resulting from Comparative Example 3-A was casted onto a support plate with a doctor blade system.

The liquid medium was removed at 130° C. under vacuum for 6 hours.

Table 1 here below reports the values of the dimensional shrinkage of the separators thereby provided:

TABLE 1

| T [° C.] | Ex. 1 | | Ex. 2 | | C. Ex. 1 | | C. Ex. 2 | | C. Ex. 3 | |
|---|---|---|---|---|---|---|---|---|---|---|
| | D1 | D2 | D1 | D2 | D1 | D2 | D1 | D2 | D1 | D2 |
| 25° C. | 0 | 0 | 0 | 0 | 0 | 0 | 0 | 0 | 0 | 0 |
| 90° C. | 0 | 0 | 0 | 0 | 2 | 3 | 0 | 4 | 0 | 0 |
| 120° C. | 0 | 0 | 0 | 0 | 2 | 3 | 0 | 4 | 0 | 0 |
| 150° C. | 0 | 0 | 0 | 0 | 3 | 3 | 1 | 4 | 0 | 0 |
| 200° C. | 1 | 0 | 1 | 3 | 5 | 3 | 3 | 4 | 1 | 0 |

Table 2 here below reports the values of the mix penetration strength of the separators thereby provided:

TABLE 2

| Run | Max Load/Separator Thickness [KN/mm] |
|---|---|
| Ex. 1 | 32 |
| Ex. 2 | 31 |
| C. Ex. 1 | 8 |
| C. Ex. 2 | 29 |
| C. Ex. 3 | 31 |

Table 3 here below reports about the values of the tensile properties of the separators thereby provided:

TABLE 3

| Run | Direction | Modulus [MPa] | Stress at break [MPa] | Strain at break [%] |
|---|---|---|---|---|
| Ex. 1 | 1 | 334 | 9.7 | 11.9 |
| | 2 | 126 | 4.0 | 9.5 |
| Ex. 2 | 1 | 401 | 11.9 | 10.8 |
| | 2 | 144 | 4.0 | 9.1 |
| C. Ex. 1 | 1 | 1345 | 35.0 | 8.9 |
| | 2 | 523 | 14.6 | 11.2 |
| C. Ex. 2 | 1 | 382 | 10.5 | 10.1 |
| | 2 | 149 | 4.5 | 9.1 |
| C. Ex. 3 | 1 | Not measurable | Not measurable | Not measurable |
| | 2 | Not measurable | Not measurable | Not measurable |

It has been thus found that the solid composite separators prepared according to the process of the invention, by applying onto a substrate (P) a liquid composition comprising a polymer (F), a filler (I) and, optionally, a compound (M), advantageously exhibited lower dimensional shrinkage values and higher mix penetration strength values, while maintaining outstanding mechanical strength, over a wide range of temperatures, as compared with prior art separators according to Comparative Examples 1 and 2.

In particular, the separator prepared according to Comparative Example 3, while exhibiting low dimensional shrinkage values and high mix penetration strength values, had lower mechanical strength as compared with the solid composite separators prepared according to the process of the invention.

EXAMPLE 3-Use of the Solid Composite Separator in a Secondary Battery

A coin cell was prepared by placing the solid composite separator provided in Example 1 between a negative electrode containing graphite as active material (TIMREX® SLP30) and a positive electrode containing $LiCoO_2$ as active material. Both electrodes contain SOLEF® 5130 polyvinylidene fluoride as binder and Super C65 as conductive carbon black.

The coin cell was filled with 150 µl of SELECTILYTE® LP30 electrolyte consisting of a 1 M solution of lithium hexafluorophosphate ($LiPF_6$) in ethylene carbonate/dimethyl carbonate (1:1 weight ratio).

Charge-discharge cycling tests were performed, wherein the positive and negative electrodes had a capacity ratio of 1.

Table 4 here below reports the values of the discharge capacity of the cell:

TABLE 4

| Discharge Rate | Number of cycles | Discharge Capacity [mAh/g] |
|---|---|---|
| 0.5 | 10 | 77 |
| 0.2 | 3 | 87 |
| 0.1 | 3 | 102 |
| 0.05 | 2 | 107 |

It has been thus found that the solid composite separator according to the invention is particularly suitable for use in electrochemical devices such as secondary batteries.

The invention claimed is:

1. A solid composite separator comprising:
   (1) at least one layer [layer (1)] made from a solid composition [composition (S)], said composition (S) comprising:
      at least one fluoropolymer [polymer (F)], said polymer (F) comprising one or more backbone chains, said backbone chains comprising recurring units derived from at least one fluorinated monomer [monomer (F)], and one or more side functional groups selected from the group consisting of —O—$R_x$ and —C(O)O—$R_x$ groups, wherein $R_x$ is a hydrogen atom or a $C_1$-$C_5$ hydrocarbon group comprising at least one hydroxyl group, and
      at least one inorganic filler [filler (I)]; and,
   adhered to at least one surface of said layer (1),
   (2) a porous substrate layer [layer (2)] made from one or more sets of polymer fibres [substrate (P)]; wherein the composite separator is obtained by applying a liquid composition onto the substrate P, thereby providing a wet substrate; and drying the wet substrate.

2. The solid composite separator according to claim 1, said solid composite separator being obtainable by the process comprising:
   applying the liquid composition [composition (L)], said composition (L) comprising:
      the at least one polymer (F),
      the at least one filler (I), and
      a liquid medium [medium (L)];

onto the substrate (P) thereby providing the wet substrate (P) [substrate (P—W)];

drying and then, optionally, curing the substrate (P-W) thereby providing the solid composite separator; and optionally, submitting to compression the solid composite separator.

3. The solid composite separator according to claim 1, wherein composition (S) further comprises at least one fluoropolymer hybrid organic/inorganic composite [polymer (F—H)] comprising fluoropolymer domains consisting of chains obtainable by at least one grafted fluoropolymer [polymer (F-G)], said polymer (F-G) comprising one or more backbone chains, said backbone chains comprising recurring units derived from at least one fluorinated monomer, and one or more pendant groups of formula —$Y_{m-1}$-$AX_{4-m}$, wherein X is a hydrocarbon group, optionally comprising one or more functional groups, m is an integer from 1 to 4, A is a metal selected from the group consisting of Si, Ti and Zr, and Y is a hydrolysable group selected from the group consisting of an alkoxy group, an acyloxy group and a hydroxyl group, and inorganic domains consisting of residues obtainable by at least one metal compound of formula (I) [compound (M)]:

$$X_{4-m}AY_m$$

wherein X is a hydrocarbon group, optionally comprising one or more functional groups, m is an integer from 1 to 4, A is a metal selected from the group consisting of Si, Ti and Zr, and Y is a hydrolysable group selected from the group consisting of an alkoxy group, an acyloxy group and a hydroxyl group.

4. The solid composite separator according to claim 3, said solid composite separator being obtainable by a process comprising:

reacting, in the liquid composition [composition (L)], said composition (L) comprising:
the at least one polymer (F),
the at least one compound (M),
the at least one filler (I), and
a liquid medium [medium (L)];

at least a fraction of said side functional group(s) of the polymer(s) (F) with at least a fraction of said hydrolysable group(s) Y of the compound(s) (M) thereby providing a liquid composition [composition (L1)] comprising polymer (F-G);

submitting to at least partial hydrolysis and/or polycondensation the composition (L1) thereby providing a liquid composition [composition (L2)] comprising at least one fluoropolymer hybrid organic/inorganic composite [polymer (F—H)] comprising fluoropolymer domains consisting of chains obtainable by polymer (F-G) and inorganic domains consisting of residues obtainable by compound (M);

applying the composition (L2) onto the substrate (P), thereby providing the wet substrate (P) [substrate (P—W)];

drying and then, optionally, curing the substrate (P-W), thereby providing the solid composite separator; and optionally, submitting to compression the solid composite separator.

5. An electrochemical device comprising the solid composite separator according to claim 1.

6. The electrochemical device according to claim 5, wherein the electrochemical device is a secondary battery.

7. A process for manufacturing the solid composite separator according to claim 1, said process comprising:

applying the liquid composition [composition (L)], said composition (L) comprising:
the at least one fluoropolymer [polymer (F)], said polymer (F) comprising one or more backbone chains, said backbone chains comprising recurring units derived from the at least one fluorinated monomer [monomer (F)], and one or more side functional groups selected from the group consisting of —O—$R_x$ and —C(O)O—$R_x$ groups, wherein $R_x$ is a hydrogen atom or a $C_1$-$C_5$ hydrocarbon group comprising at least one hydroxyl group,
the at least one inorganic filler [filler (I)], and
a liquid medium [medium (L)];

onto the porous substrate layer made from one or more sets of polymer fibres [substrate (P)] thereby providing the wet substrate (P) [substrate (P—W)];

drying and then, optionally, curing the substrate (P-W) thereby providing the solid composite separator; and optionally, submitting to compression the solid composite separator.

8. The process according to claim 7, said process comprising:

reacting, in the liquid composition [composition (L)], said composition (L) comprising:
the at least one fluoropolymer [polymer (F)], said polymer (F) comprising one or more backbone chains, said backbone chains comprising recurring units derived from at least one fluorinated monomer [monomer (F)], and one or more side functional groups selected from the group consisting of —O—$R_x$ and —C(O)O—$R_x$ groups, wherein $R_x$ is a hydrogen atom or a $C_1$-$C_5$ hydrocarbon group comprising at least one hydroxyl group,
at least one metal compound of formula (I) [compound (M)]:

$$X_{4-m}AY_m$$

wherein X is a hydrocarbon group, optionally comprising one or more functional groups, m is an integer from 1 to 4, A is a metal selected from the group consisting of Si, Ti and Zr, and Y is a hydrolysable group selected from the group consisting of an alkoxy group, an acyloxy group and a hydroxyl group,
at least one inorganic filler [filler (I)], and
the liquid medium [medium (L)];

at least a fraction of said side functional group(s) of the polymer(s) (F) with at least a fraction of said hydrolysable group(s) Y of the compound(s) M thereby providing a liquid composition [composition (L1)] comprising at least one grafted fluoropolymer [polymer (F-G)], the polymer (F-G) comprising one or more backbone chains, said backbone chains comprising recurring units derived from at least one fluorinated monomer, and one or more pendant groups of formula —$Y_{m-1}$-$AX_{4-m}$, wherein X is a hydrocarbon group, optionally comprising one or more functional groups, m is an integer from 1 to 4, A is a metal selected from the group consisting of Si, Ti and Zr, and Y is a hydrolysable group selected from the group consisting of an alkoxy group, an acyloxy group and a hydroxyl group;

submitting to at least partial hydrolysis and/or polycondensation the composition (L1) thereby providing a liquid composition [composition (L2)] comprising at least one fluoropolymer hybrid organic/inorganic composite [polymer (F—H)] comprising fluorpolymer domains consisting of chains obtainable by the polymer (F-G) and inorganic domains consisting of residues obtainable by the compound (M);

applying the composition (L) onto the porous substrate layer made from one or more sets of polymer fibres [substrate (P)], thereby providing a wet substrate (P) [substrate (P—W)];

drying and then, optionally, curing the substrate (P—W) thereby providing the solid composite separator; and optionally, submitting to compression the solid composite separator.

9. The process according to claim 7, wherein polymer (F) is obtainable by polymerization of at least one fluorinated monomer [monomer (F)] and at least one hydrogenated monomer comprising one or more functional groups selected from the group consisting of —O—$R_x$ and —C(O)O—$R_x$ groups, wherein $R_x$ is a hydrogen atom or a $C_1$-$C_5$ hydrocarbon group comprising at least one hydroxyl group [monomer ($H_f$)].

10. The process according to claim 9, wherein monomer ($H_f$) is a (meth)acrylic monomer of formula (II):

(II)

wherein each of $R_1$, $R_2$ and $R_3$, equal to or different from each other, is independently a hydrogen atom or a $C_1$-$C_3$ hydrocarbon group, and $R_x$ is a hydrogen atom or a $C_1$-$C_5$ hydrocarbon moiety comprising at least one hydroxyl group.

11. The process according to claim 7, wherein the polymer (F) is selected from the group consisting of:

polymers (F-1) comprising recurring units derived from vinylidene fluoride (VDF) and from at least one hydrogenated monomer comprising one or more functional groups selected from the group consisting of —O—$R_x$ and —C(O)O—$R_x$ groups, wherein $R_x$ is a hydrogen atom or a $C_1$-$C_5$ hydrocarbon group comprising at least one hydroxyl group [monomer ($H_f$)], and polymers (F-2) comprising recurring units derived from at least one hydrogenated monomer comprising one or more functional groups selected from the group consisting of —O—$R_x$ and —C(O)O—$R_x$ groups, wherein $R_x$ is a hydrogen atom or a $C_1$-$C_5$ hydrocarbon group comprising at least one hydroxyl group [monomer ($H_f$)], from at least one per(halo)fluoromonomer selected from tetrafluoroethylene (TFE) and chlorotrifluoroethylene (CTFE), and from at least one monomer (H) selected from ethylene, propylene and isobutylene.

12. The process according to claim 7, wherein composition (L) is obtainable by adding at least one filler (I) to an aqueous latex comprising at least one polymer (F).

13. The process according to claim 8, wherein composition (L) is obtainable by adding at least one filler (I) and at least one compound (M) to an aqueous latex comprising at least one polymer (F).

14. The process according to claim 7, wherein substrate (P) is made from one or more sets of polymer fibres, wherein said polymer fibres are made of electrically non-conductive polymers selected from the group consisting of polyesters, polyacrylonitrile, polyamides, polyimides, polyacrylates, polytetrafluoroethylene and polyolefins.

15. The process according to claim 7, wherein substrate (P) is a non-woven fabric made from one or more sets of polymer fibres.

16. The process according to claim 7, wherein the substrate (P) has a thickness comprised between 10 µm and 200 µm.

17. The process according to claim 7, wherein composition (L) consists of:
the at least one polymer (F),
the at least one filler (I), and
the liquid medium (L).

18. The process according to claim 7, wherein composition (L) consists of:
the at least one polymer (F),
the at least one compound (M),
the at least one filler (I), and
the medium (L).

19. The process according to claim 14, wherein the polyester is polyethylene terephthalate.

20. An electrochemical device comprising the solid composite separator according to claim 3.